US009605749B2

(12) United States Patent
Shirokoshi

(10) Patent No.: US 9,605,749 B2
(45) Date of Patent: Mar. 28, 2017

(54) PLANETARY GEAR REDUCER

(71) Applicant: HARMONIC DRIVE SYSTEMS INC., Shinagawa-ku, Tokyo (JP)

(72) Inventor: Norio Shirokoshi, Azumino (JP)

(73) Assignee: HARMONIC DRIVE SYSTEMS INC., Shinagawa-ku, Tokyo (JP)

( * ) Notice: Subject to any disclaimer, the term of this patent is extended or adjusted under 35 U.S.C. 154(b) by 0 days.

(21) Appl. No.: 14/797,305

(22) Filed: Jul. 13, 2015

(65) Prior Publication Data

US 2016/0319927 A1 Nov. 3, 2016

(30) Foreign Application Priority Data

Apr. 28, 2015 (JP) ................................ 2015-092036

(51) Int. Cl.
*F16H 57/08* (2006.01)
*F16H 1/28* (2006.01)

(52) U.S. Cl.
CPC ............ *F16H 57/082* (2013.01); *F16H 1/28* (2013.01)

(58) Field of Classification Search
CPC .......... F16H 57/082; F16H 1/28; F16H 57/02
See application file for complete search history.

(56) References Cited

U.S. PATENT DOCUMENTS 4,656,890 A * 4/1987 Marquardt ............. F16D 1/076 403/337
6,814,684 B2 * 11/2004 Schulz ................. F16C 19/364 384/428
6,824,495 B1 * 11/2004 Kirschner ................ F16H 1/28 475/331
8,241,172 B2 * 8/2012 Lahtinen .............. F16H 1/2836 475/348
9,121,488 B2 * 9/2015 Magiera .............. B60K 17/043
9,316,303 B2 * 4/2016 Watanabe ............ F16H 57/082
2003/0032521 A1 * 2/2003 Boston .................... F16C 21/00 475/331
2006/0096412 A1 * 5/2006 Wittenstein .............. F16H 1/28 74/606 R
2006/0166771 A1 * 7/2006 Yamanaka ............ B62D 5/008 475/4
2009/0023544 A1 * 1/2009 Nitzpon ................ F01D 11/001 475/338
2009/0101424 A1 * 4/2009 Suzuki ................ B60K 7/0007 180/65.51
2011/0277573 A1 * 11/2011 Duong ...................... F16H 1/26 74/409
2014/0045644 A1 * 2/2014 Boland ................ F16H 57/082 475/331

FOREIGN PATENT DOCUMENTS

JP 2005-009614 A 1/2005
JP 2006-258270 A 9/2006

* cited by examiner

*Primary Examiner* — David J Hlavka
(74) *Attorney, Agent, or Firm* — Buchanan Ingersoll & Rooney PC

(57) ABSTRACT

A planetary gear reducer has a planetary carrier supported by an input-side main bearing and an output-side main bearing. An angular contact ball bearing or a deep groove ball bearing which requires less installation space and is inexpensive is used for the input-side main bearing. A tapered roller bearing having a large capacity is used for the output-side main bearing. A compact, flat and inexpensive planetary gear reducer can be realized in comparison with a case in which the both main bearings are tapered roller bearings.

4 Claims, 3 Drawing Sheets

PLANETARY GEAR REDUCER

TECHNICAL FIELD

The present invention relates to a planetary gear reducer in which a planetary carrier for supporting planetary gears is supported by a pair of main bearings.

BACKGROUND ART

A planetary gear reducer of this kind is disclosed in Patent documents 1 and 2. Planetary gear reducers disclosed in these Patent documents have a planetary carrier supported by a pair of tapered roller bearings in a both-end supported manner.

PRIOR ART DOCUMENT

Patent Document

[Patent Document 1] JP 2006-258270 A
[Patent Document 2] JP 2005-9614 A

SUMMARY OF THE INVENTION

An object of the present invention is to provide a planetary gear reducer having a pair of main bearings, which has a structure enable to reduce in size, length and cost of the reducer, and to enhance the design flexibility thereof.

In order to achieve the above and other objects, there is provided a planetary gear reducer comprising:

a planetary gear;

a planetary carrier for supporting the planetary gear; and a pair of main bearings for supporting the planetary carrier, wherein the pair of the main bearings are either one of the following combinations of:

a deep groove ball bearing and an angular contact ball bearing;

a deep groove ball bearing and a tapered roller bearing; or an angular contact ball bearing and a tapered roller bearing.

Conventionally, the same type of bearing is used for both a pair of main bearings to support a planetary carrier. For example, when an output-side main bearing is a tapered roller bearing, an input-side main bearing is also a tapered roller bearing. Likewise, when the output-side main bearing is a deep groove ball bearing, the same type of bearing, a deep groove ball bearing, is used as the input-side main bearing. When the output-side main bearing is an angular contact ball bearing, the same type of bearing, an angular contact ball bearing, is also used as the input-side main bearing.

A tapered roller bearing has a load capacity larger than a deep groove ball bearing and other types of bearings and is capable of bearing thrust load, while it requires more installation space than other types of bearings. This may cause to increase in axial length of a reducer, which is an obstacle to making a small and flat reducer.

According to the present invention, the types of the pair of the main bearing are different with each other. A combination of different types of bearings is employed. For example, a tapered roller bearing having a large load capacity is used for one of the main bearings and a deep groove ball bearing which is inexpensive and requires less installation space is used for the other of the main bearings. With this configuration, it is advantageous for a reducer to be made compact and flat with low prices in comparison with a conventional case in which a tapered roller bearing is used for both the main bearings. In addition, the flexibility of design for components of the reducer is enhanced by using a combination of different types of bearings.

In particular, since a high load capacity is usually required on the output-side of the reducer, a tapered roller bearing is preferably adopted for the output-side main bearing. In contrast, since a load capacity required on the input-side of the reducer is usually comparatively low, it is preferable to use an inexpensive deep groove ball bearing or an angular contact ball bearing for the input-side main bearing. According to the present invention, it is possible to realize a planetary gear reducer which satisfies required mechanical properties and can be made flat and inexpensively compared to conventional planetary gear reducers.

MODE FOR CARRYING OUT THE INVENTION

An embodiment of a planetary gear reducer according to the present invention will be described with reference to the drawings.

Figure 1:
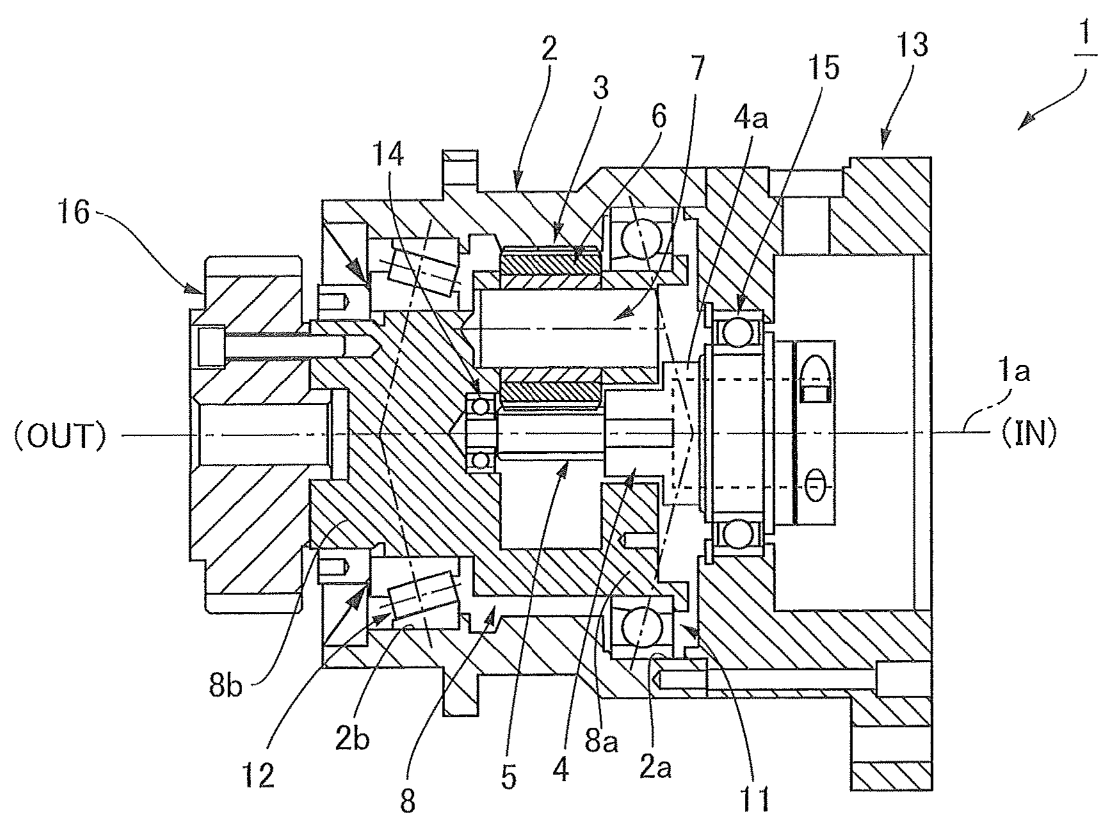
FIG. 1 is a longitudinal sectional view showing an example of a planetary gear reducer according to the present invention.

FIG. 1 is a longitudinal sectional view showing an example of a planetary gear reducer according to the present invention. The planetary gear reducer 1 has a tubular housing 2. The housing 2 is formed integrally on an inner peripheral surface thereof with an internal gear 3. In the housing 2, a sun gear 5 is arranged in a coaxial state and is fixed coaxially to an input shaft 4. One or plural planetary gears 6 are arranged concentrically between the internal gear 3 and the sun gear 5, and are meshed with both gears 3, 5.

The planetary gears 6 are rotatably supported on planetary shafts 7, respectively. The planetary shafts 7 are mounted on a planetary carrier 8. The planetary carrier 8 has an input-side carrier end part **8*a* and an output-side carrier end part 8*b*, between which the planetary shafts 7 are bridged in the direction of the center axis line 1*a*. The input-side carrier end part 8*a* is positioned on a reducer input side IN and the output-side carrier end part 8*b* on a reducer output side OUT in the direction of the center axis line 1*a***.

The planetary carrier 8 is supported by an input-side main bearing 11 and an output-side main bearing 12 in a manner rotatable about the center axis line **1*a*. In this example, an angular contact ball bearing is used for the input-side main bearing 11, and a tapered roller bearing is for the output-side main bearing 12**.

The inner peripheral surface of the housing 2 has an inner peripheral surface portion **2*a* which is positioned at the reducer input side with respect to the internal gear 3, and the input-side carrier end part 8*a* has an outer peripheral surface opposite to the inner peripheral surface portion 2*a*. The input-side main bearing 11 is mounted between the inner peripheral surface portion 2*a*** and the outer surface portion.

The input shaft 4 to which the sun gear 5 is fixed has a shaft end part **4*a* projecting from the input-side carrier end part 8*a* of the planetary carrier 8 to the reducer input side. A coupling mechanism 13 is coaxially fixed by fastening on an input-side end part of the housing 2**. The shaft end part

4*a* of the input shaft 4 is fixedly connected to a rotation input member such as a motor shaft (not shown) via the coupling mechanism 13.

An input shaft assembly comprising the sun gear 5 and the input shaft 4 is supported by bearings 14 and 15. The bearing 14 supports an output-side end of the input shaft assembly, while the bearing 15 supports an input-side end thereof. The output-side bearing 14 is accommodated in a recess part which is formed on the center portion of an input-side end surface of the output-side carrier end part 8*b* of the planetary carrier 8. The input-side bearing 15 is accommodated between the shaft end part 4*a* of the input shaft 4 and an inner peripheral surface portion of the coupling mechanism 13 opposite to the shaft end part 4*a*.

The output-side carrier end part 8*b* of the planetary carrier 8 has an output-side end part exposed to the reducer output side from the housing 2. An outputting pinion 16 as an output member of the reducer is coaxially fixed by fastening to the exposed output-side end part.

In the planetary gear reducer 1, a tapered roller bearing having a large load capacity is used as the output-side main bearing 12, while an angular contact ball bearing which requires less installation space and is inexpensive is used as the input-side main gearing 11. Thus, it is advantageous in reducing the size, length and manufacturing cost of the reducer in comparison with a case in which the same type of bearing such as a tapered roller bearing is used for both the main bearings as in the prior art. Further, compared to a case in which an angular contact ball bearing or a deep groove ball bearing is used for both the main bearings, it is easy to enhance the load capacity of the reducer at the reducer output side.

Figure 2:
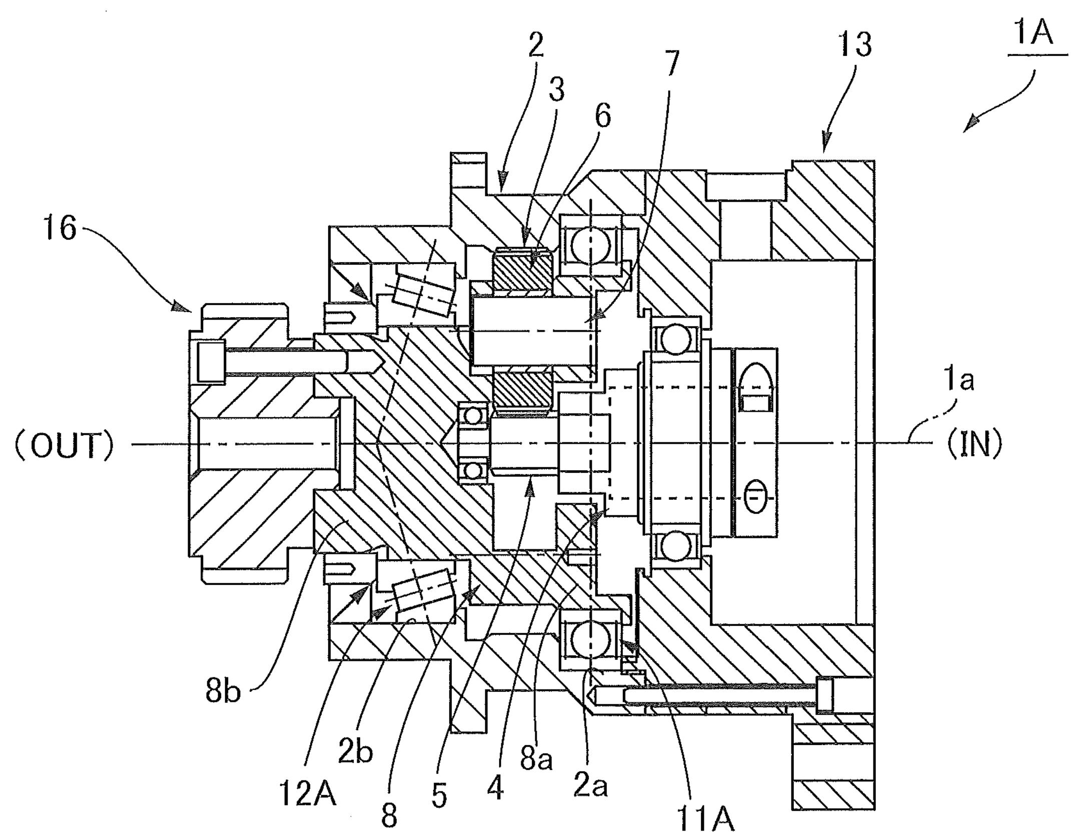
FIG. 2 is a longitudinal sectional view showing a modified example of the planetary gear reducer of FIG. 1.

FIG. 2 is a longitudinal sectional view showing a modified example of the above-mentioned planetary gear reducer 1. A planetary gear reducer 1A shown in this figure has the same basic structure as that of the planetary gear reducer 1, and sections in FIG. 2 corresponding to those in FIG. 1 are denoted by the same numerals and explanations thereof are omitted.

In the planetary gear reducer 1A, a tapered roller bearing is used for the output-side main bearing 12A, while a deep groove ball bearing is used for the input-side main bearing 11A. With this configuration, more compact and flat planetary gear reducer can be realized.

Where the required load capacity is not so high, double row angular contact ball bearings can be used for the output-side main bearing, and double row deep groove ball bearings or a single row deep groove bearing is used for the input-side main bearing. Adversely, a single row deep groove ball bearing or double row deep groove ball bearings may be used for the output-side main bearing, and double row angular contact ball bearings be used for the input-side main bearing. The flexibility of layout for reducer components is enhanced by using bearings of different types for the input-side and output-side main bearings.

Figure 3:
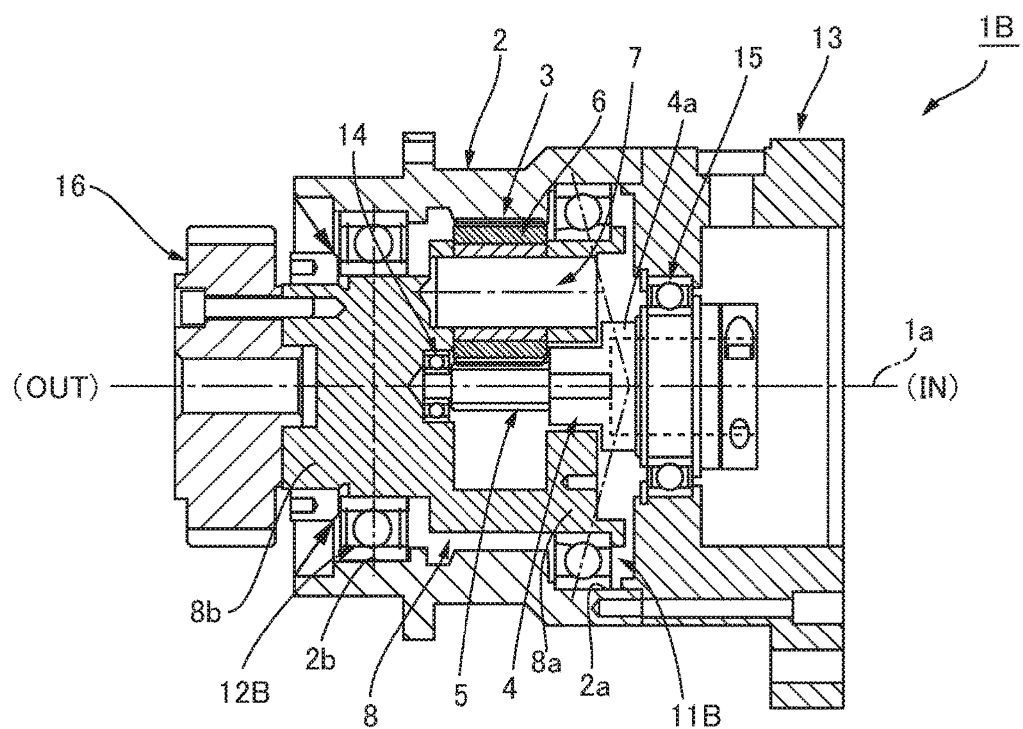
FIG. 3 is a longitudinal sectional view showing another modified example of the planetary gear reducer of FIG. 1.

FIG. 3 is a longitudinal sectional view showing another modified example of the above-mentioned planetary gear reducer 1. A planetary gear reducer 1B shown in this figure has the same basic structure as that of the planetary gear reducer 1, and sections in FIG. 3 corresponding to those in FIG. 1 are denoted by the same numerals and explanations thereof are omitted.

In the planetary gear reducer 1B, a deep groove ball bearing 12B is used for the output-side main bearing, while an angular contact ball bearing 11B is used for the input-side main bearing. With this configuration, more compact and flat planetary gear reducer can be realized.

The invention claimed is:

1. A planetary gear reducer comprising:

a tubular housing a planetary gear;

a planetary carrier for supporting the planetary gear in the tubular housing; and a pair of main bearings for supporting the planetary carrier on an inner peripheral surface of the housing;

wherein the pair of the main bearings are either one of the following combinations of:

a deep groove ball bearing and an angular contact ball bearing;

a deep groove ball bearing and a tapered roller bearing; and an angular contact ball bearing and a tapered roller bearing.

2. The planetary gear reducer according to claim 1, wherein:

the pair of the main bearings are the deep groove ball bearing and the tapered roller bearing;

the tapered roller bearing is positioned on a reducer output side in a direction of a reducer axis line with respect to the planetary gear; and the deep groove ball bearing is positioned on a reducer input side in the direction of the reducer axis line with respect to the planetary gear.

3. The planetary gear reducer according to claim 1, wherein:

the pair of the main bearings are the angular contact ball bearing and the tapered roller bearing;

the tapered roller bearing is positioned on a reducer output side in a direction of a reducer axis line with respect to the planetary gear; and the angular contact ball bearing is positioned on a reducer input side in the direction of the reducer axis line with respect to the planetary gear.

4. The planetary gear reducer according to claim 1, wherein the pair of the main bearings engage with the inner peripheral surface of the housing to support the planetary carrier.

* * * * *